Aug. 24, 1937.

P. KIRBACH 2,090,730.

CUTTER

Original Filed Dec. 6, 1933

INVENTOR
PETER KIRBACH
BY
ATTORNEY

Patented Aug. 24, 1937

2,090,730

UNITED STATES PATENT OFFICE 2,090,730

CUTTER

Peter Kirbach, Chicago, Ill.

Application December 6, 1933, Serial No. 701,166
Renewed January 18, 1937

7 Claims. (Cl. 30—130)

This invention relates to cutters and has for its object the production of a device of this character particularly adaptable for use in connection with the manipulation and forming of dough and the delivery thereof to the cooking receptacle or vessel.

With the above and other objects in view, as will be apparent, this invention consists in the construction, combination and arrangement of parts all as hereinafter more fully described, claimed and illustrated in the accompanying drawing, wherein:—

Figure 1:
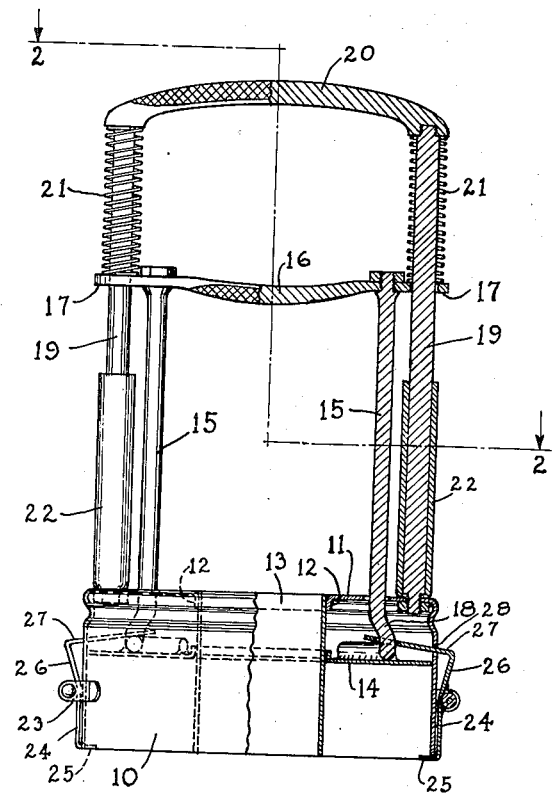
Figure 2:
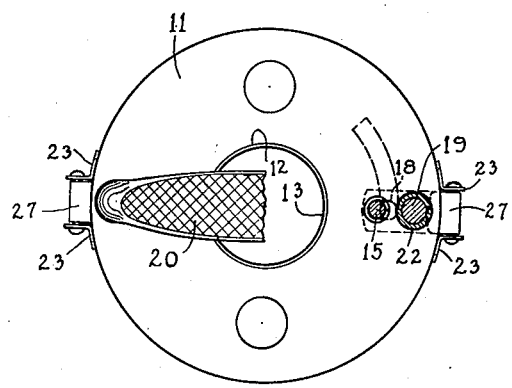

Fig. 1 is a side elevation of a cutter constructed in accordance with the present invention with parts thereof broken away to illustrate the details of the construction thereof: and Fig. 2 is an irregular horizontal section taken along line 2—2 of Fig. 1.

While the present invention may be of general application, it is designed primarily for the cutting and forming of doughnuts wherein a ring of dough surrounds a central aperture.

Doughnuts, as is well known, are cooked in hot fat or grease and heretofore, particularly in the production of domestic doughnuts, the dough has been rolled upon a supporting surface or block, after which a cutter is used for severing and forming the individual dough masses. It has then been necessary to individually lift each formed dough mass and place it in the cooking receptacle. This has resulted in the distortion of the dough mass and is, generally speaking, an unsatisfactory and laborious process.

The present invention is designed to cut and form the individual dough mass for delivery to the cooking receptacle and to retain each cut and formed dough mass within the cutter for delivery to the cooking vessel. In other words, the present invention contemplates a single cutting, forming and delivering operation and eliminates the manual transfer of the cut and formed dough mass to the cooking receptacle after the cutting and forming thereof.

Reference being had more particularly to the drawing, 10 designates a cutting shell open at one end and closed by the wall 11 at the opposite end. Obviously, while this shell 10 is illustrated as being circular, it may be of any desired shape and construction. The wall 11 is provided with a central aperture 12 in which is inserted a tube 13 which is coextensive with the depth of the shell 10, the upper end of the tube 13 being coplanar with the wall 11 and the lower end resting in the same plane as the edge of the shell 10. This tube 13 constitutes the corer by means of which an opening is provided in the center of the formed dough mass and it is, of course, to be understood that this tube 13 while being illustrated as being round concentric to the shell 10 may be of any suitable shape and in fact, if it is desired to deliver solid formed dough masses, may be entirely eliminated. In operation the open end of the shell 10 is placed upon the rolled dough mass positioned upon a suitable supporting surface or block. Pressure is then applied to the shell which results in the corresponding edges of the shell 10 and the tube 13 cutting through the dough mass creating a ring of dough between the tube 13 and the shell 10. The core which is cut out is within the tube 13 and may be removed therefrom in any suitable manner.

The present invention contemplates retaining the dough ring thus formed within the shell for immediate and direct delivery to the cooking vessel or receptacle where it is discharged.

Within the shell 10 and positioned between the tube 13 and the wall of the shell is an ejection plate 14 completely filling the space between the tube and the shell and normally occupying a position substantially parallel to the wall or closed end 11 of the shell 10. For the operation of the ejection plate 14 two parallel rods 15 pierce the wall 11 of the shell 10 and project upwardly therefrom. At their upper ends these rods 15 are connected by a transverse gripping bar 16 which is rigidly secured to the outer terminals of the rods 15 and which includes bearing members 17 projecting beyond the rods 15. At their lower ends, and within the shell 10, each of the rods 15 is off-set laterally, as at 18, and are connected beyond said off-set portion directly to the plate 14. Thus, it is apparent that by manipulating the gripping bar 16, the rods 15 may be reciprocated through the wall 11 whereby a corresponding action or movement is imparted to the ejection plate 14 within the shell 10.

Upon each side of the rods 15 are the diametrically opposed handle bars 19 which at their lower ends are fixedly secured to the wall 11 of the shell 10 adjoining the periphery thereof and in diametrical alignment with the rods 15. The upper end of these handle bars 19 are connected by a transverse gripping handle 20 rigidly and fixedly secured to the outer terminals of the handle bars 19. This gripping handle 20 is substantially parallel to the gripping bar 16. The bearing members 17 of the gripping bar 16 are orificed to permit the handle bars 19 to pass therethrough whereby the gripping bar 16 may freely slide upon the handle bars 19. Coil springs 21 are interposed between the terminals of the handle 20 and the bearings 17 of the gripping bar 16 which normally tend to force the gripping bar 16 and rods 15 together with the plate 14 toward the open end of the shell 10.

To limit this downward movement of the bar 16 so that when the plate 14 reaches a point where it is aligned with the outer cutting edge of the shell 10 and tube 13 the movement is arrested by a sleeve 22 mounted upon each of the handle bars 19 adjoining the wall 11 of the shell 10.

When the ejection plate 14 is aligned with the cutting edges of the tube 13 and shell 10 the bearing projections 17 of the gripping bar 16 contact with the outer ends of the sleeves 22.

In operation the hand of the operator engages the handle 20 with one or more fingers contacting with the gripping bar 16. As the palm of the hand of the operator exerts a pressure upon the handle 20, which pressure is transmitted through the bars 19 to the shell 10 and tube 13, the fingers contacting with the gripping bar 16 move the latter outwardly upon the bars 19 toward the handle 20 and against the action of the springs 21. Consequently, while the shell 10 and tube 13 pass through the dough mass upon the block or supporting surface, the plate 14 retracts to a point within the shell 10 adjoining the wall 11 and is there held so long as the hand of the operator engages the gripping bar 16 and maintains it in a position adjoining the handle 20. The cut and formed dough mass is then contained within the shell 10 between the wall of the shell and the tube 13. Under normal conditions the cutter may be then lifted and moved to a position over the cooking receptacle the cut and formed dough mass being retained within the shell 10 during this operation. When the cutter is positioned above the cooking receptacle the operator may then release the gripping bar 16 whereupon the springs 21 force the bar 16 and rods 15 together with the plate toward the open end of the shell 10 until the bearing members 17 of the bar 16 contact with the outer ends of the sleeves 22. After this is accomplished the plate 14 in traveling toward the open end of the shell 10 forces the cut and formed dough mass from the shell 10 and causes it to drop into the cooking receptacle.

It is obvious therefore, that by the use of the present cutter, as above described, the cutting, forming and delivering of the cut and formed dough mass to the cooking receptacle is a single unitary operation accomplished by a single tool and without any additional steps whatever.

If it is desired additional means may be provided to maintain the cut and formed dough mass within the shell 10 during its transfer from the block or supporting surface to the cooking vessel or receptacle. For this purpose a pair of ears 23 are provided on the outer surface of the side wall of the shell 10 in alignment with the bars 19 and rods 15. Pivoted between each of these pair of ears is a lever 24 terminating at its lower end in a transverse tooth 25 which may pass under the outer edge of the shell 10. The upper end of the lever 24 is flared outwardly as at 26 and is bent at substantially right angles to create an operating extension 27 which passes through the side wall of the shell 10. At its inner end this operating extension 27 is provided with an opening 28 through which one of the rods 15 passes. When the body of the lever 24 rests substantially flush against the outer surface of the side wall of the shell 10, the tooth 25 passes under the edge of said wall and projects to some extent over the space between the wall and the tube 13. On the contrary, when the flared terminal 26 rests flush against the outer surface of the wall of the shell 10 the tooth 25 is retracted and does not project over the space between the wall of the shell 10 and the tube 13. Therefore, when the body of the lever 24 rests against the wall, the passage of the dough from the space between the tube 13 and the wall of the shell 10 is impeded by the tooth 25 and reversely when the flared portion of the lever 24 rests against the wall of the shell 10, the passage of the dough from the space between the tube 13 and the wall of the shell 10 is unimpeded.

It is to be observed that the operating extensions 27 of the levers 24 project into the shell 10 between the wall 11 thereof and the plate 14.

When the elements are in the position shown in Fig. 1, the laterally off-set portions 18 of the rods 15 are within the openings 28 of the operating extensions 27 of the levers 24. Thus, by virtue of the off-sets 18, the operating extensions 27 are moved outwardly to position the levers 24 substantially flush against the wall of the shell 10. Thus, when the cut and formed dough mass is positioned between the shell 10 and the tube 13, the teeth 25 are positioned as illustrated in Fig. 1 and provide an additional security in holding the dough mass within the shell 10 during the transfer thereof to the cooking receptacle. When the bar 16 is released and moved toward the wall 11 of the shell 10, the initial movement of the rods 15 under the influence of the springs 21, causes the inner ends of the operating extensions 27 to travel along the curved off-set portions 18 of the rods 15 until the bodies of the rods are operating through the openings 28 of such extensions. This causes the operating extensions 27 to move inwardly positioning the flared portions 26 of the levers 24 against the wall of the shell 10 and retracting the teeth 25 so that the plate 14 may quickly and easily eject the cut and formed dough mass without interference from the teeth 25. This retracting of the teeth 25 is accomplished as above noted at the initial movement of the rods 15 and plate 14 within the shell. When the bar 16 is elevated against the action of the springs 21 during the cutting and forming of another dough mass the teeth 25 are projected across the space between the wall of the shell 10 and the tube 13 at the end of a movement of the plate 14 away from the open end of the shell so that the cut and formed dough mass is within the shell 10 prior to the projection of the teeth across the cutting edge of the shell 10.

From the foregoing it is manifest that the present invention, with or without the levers 24 and teeth 25, cuts and forms dough masses and transfers and delivers them to the cooking vessel. Manifestly, any shape and size of shell 10 may be employed and the tube 13 may or may not be incorporated in the device dependent upon the desired character of the cut and formed dough mass. Furthermore, it is obvious that a plurality of the present cutters may be incorporated in a single unit and operated simultaneously so that more than one cut and formed dough mass may be created at the same time.

What is claimed is:—

1. The combination with a shell having one end open, of a plate mounted for movement in said shell, bars on said shell, rods secured to said plate, a gripping bar connecting said rods and slideably mounted on the bars aforesaid, and means mounted on the bars and coacting with the gripping bar, for moving the plate toward the open end of the shell.

2. The combination with a shell having one end open, of a plate mounted for movement in said shell, bars on said shell, rods secured to said plate, a gripping bar connecting said rods and slideably mounted on the bars aforesaid, a handle connecting said bars parallel to said gripping bar, and springs interposed between the handle and the gripping bar.

3. The combination with a shell having one end open, of a plate mounted for movement in said shell, bars fixed to said shell, rods connecting the outer ends of said bars, rods secured to said plate, a gripping bar connecting the ends of said rods, and springs interposed between said handle and said gripping bar to move the plate toward the open end of the shell.

4. The combination with a shell having one end open, of a plate mounted for movement in said shell, bars fixed to said shell, a handle connecting the outer ends of said bars, rods secured to said plate, a gripping bar connecting the ends of said rods, springs mounted on said bars and interposed between the handle and gripping bar for moving the plate toward the open end of the shell, and means for retaining the contents within the shell when the plate is remote from the open end thereof.

5. The combination with a shell having one end open, a plate mounted for movement therein, means for moving said plate toward and from the open end of the shell, and means mounted on the shell under the control of the movement of the plate for retaining dough masses therein.

6. The combination with a shell having one end open, a plate mounted for movement therein, means for moving said plate toward and from the open end of the shell, and means mounted on the shell under the control of the movement of the plate for retaining dough masses therein when the plate is remote from the open end of the shell.

7. The combination with a shell open at one end, of a handle therefor comprising a section fixed to said shell and a section moveable relatively thereto, a plate mounted for movement in said shell and connected to said moveable handle section, means for moving said handle sections relatively to cause said plate to eject a dough mass from the open end of said shell, teeth mounted on said shell to be projected across the open end thereof, and means under the control of said plate for retracting said teeth as the plate moves to eject a dough mass.

PETER KIRBACH.